US009058524B2

(12) United States Patent
Kuehnle (10) Patent No.: US 9,058,524 B2
(45) Date of Patent: Jun. 16, 2015

(54) MEASURING THE RANGE TO AN OBJECT, IN AN IMAGE, USING SIZE CATEGORIZATION

(71) Applicant: Andreas U. Kuehnle, Villa Park, CA (US)

(72) Inventor: Andreas U. Kuehnle, Villa Park, CA (US)

(73) Assignee: BENDIX COMMERCIAL VEHICLE SYSTEMS LLC, Elyria, OH (US)

( * ) Notice: Subject to any disclaimer, the term of this patent is extended or adjusted under 35 U.S.C. 154(b) by 211 days.

(21) Appl. No.: 13/930,910

(22) Filed: Jun. 28, 2013

(65) Prior Publication Data

US 2015/0003670 A1    Jan. 1, 2015

(51) Int. Cl.
*G06K 9/00* (2006.01)
*G06T 7/00* (2006.01)
*G05D 1/00* (2006.01)

(52) U.S. Cl.
CPC .......... *G06K 9/00805* (2013.01); *G06T 7/0042* (2013.01); *G06T 2207/10016* (2013.01); *G06T 2207/30261* (2013.01)

(58) Field of Classification Search
USPC ......... 382/100, 103–107, 122–123, 154, 162, 382/168, 173, 181, 199, 206, 209, 224, 232, 382/254, 262, 274, 276, 286–291, 305, 382/312; 375/240.12; 701/2
See application file for complete search history.

(56) References Cited

U.S. PATENT DOCUMENTS

| 4,931,937 | A  |   | 6/1990  | Kakinami et al. |
|-----------|----|---|---------|-----------------|
| 5,161,632 | A  |   | 11/1992 | Asayama |
| 6,873,912 | B2 |   | 3/2005  | Shimomura |
| 7,042,389 | B2 |   | 5/2006  | Shirai |
| 7,623,681 | B2 |   | 11/2009 | Miyahara |
| 7,639,841 | B2 | * | 12/2009 | Zhu et al. ...................... 382/104 |
| 7,974,342 | B2 | * | 7/2011  | De Haan .................. 375/240.12 |
| 8,164,628 | B2 |   | 4/2012  | Stein et al. |
| 8,605,947 | B2 | * | 12/2013 | Zhang et al. .................. 382/104 |
| 2008/0027591 | A1 | * | 1/2008 | Lenser et al. ..................... 701/2 |
| 2010/0172542 | A1 | * | 7/2010 | Stein et al. .................... 382/103 |

FOREIGN PATENT DOCUMENTS

WO    2013/009697 A1    1/2013

* cited by examiner

*Primary Examiner* — Seyed Azarian
(74) *Attorney, Agent, or Firm* — Fay Sharpe LLP (57) ABSTRACT

When determining a range of distance to an object or vehicle in front of or behind the host vehicle, image data of the object is captured and analyzed to determine the relative location of the object relative to the bottom of an image frame containing the object as well as with a feature measurement of the object measured in pixels across a plurality of image frames. The object is classified into one of a plurality of discrete size categories as a function of its relative location and median feature measurement. Once the object is classified, a table lookup is performed to identify the distance range for the object relative to a host vehicle as a function of a monitored median feature measurement of the object and the discrete size category assigned to the object.

24 Claims, 4 Drawing Sheets

MEASURING THE RANGE TO AN OBJECT, IN AN IMAGE, USING SIZE CATEGORIZATION

BACKGROUND

The present application finds particular application in vehicle monitoring systems, particularly involving collision avoidance. However, it will be appreciated that the described techniques may also find application in other object monitoring systems, other vehicle systems, or the like.

Conventional methods for determining distance to an object employ a smoothed value for a dimension, which is then later used for ranging. Typical approaches to smoothing may employ a Kalman filter (i.e., a recursive averaging procedure) and therefore suffer from sensitivity to noise. Kalman filtering assumes a certain behavior (e.g. Gaussian noise) for the measurement errors, and can thereby produce erroneous results when the errors are not Gaussian or when a large error occurs. A smooth, continuous, value can be produced using conventional techniques, but this approach masks the underlying discrete and possibly significantly incorrect result.

Traditional object tracking systems use, for example, a vehicle template to track a target vehicle, and then determine a change in size and location of pixels that encompass the target vehicle relative to the vehicle template. In this manner, the change in distance and position of the target vehicle is monitored. Using such approaches, only individual pixel changes are monitored and vehicle size must be continuously recalculated. Other approaches employ radar and camera object detection systems, wherein the radar is used to compute the following distance to a target vehicle, and once the vehicle is no longer within radar range, the camera is used to calculate the following distance by comparing the last known image stored in memory when distance was calculated by the radar and comparing it to a new camera image. For instance, pixel width is compared to vehicle size to determine if the target vehicle is getting further away or closer to the host vehicle. However, such systems must continuously recalculate vehicle size.

The present innovation provides new and improved systems and methods that facilitate performing initial size calculation for a vehicle and monitoring vehicle distance as a function of the initially calculated vehicle size, which overcome the above-referenced problems and others.

SUMMARY

In accordance with one aspect, a method for estimating distance from a host vehicle to an object comprises capturing image data, identifying the object in the image data, determining a relative location of the object within at least one frame of image data, and determining a median feature measurement, in pixels, of the object. The method further comprises classifying the object as belonging to at least one of a plurality of size categories as a function of the relative location and median feature measurement of the object, identifying a distance range to the object.

In accordance with another aspect, a processor is configured to estimate distance from a host vehicle to an object, wherein the processor is configured to receive image data, identify the object in the image data, determine a relative location of the object within at least one frame of image data, and determine a median feature measurement, in pixels, of the object. The processor is further configured to classify the object as belonging to at least one of a plurality of size categories as a function of the relative location and median feature measurement of the object, identify a distance range to the object.

According to another aspect, a method for estimating distance from a host vehicle to an object comprises receiving image data, identifying the object in the image data, determining the relative location of a lower surface of the object within at least one frame of image data using a known camera geometry, and determining a median feature measurement, in pixels, of the object. The method further comprises classifying the object as belonging to at least one of a plurality of size categories as a function of the relative location and median feature measurement of the object, identifying a distance range that correlates to a median feature measurement value for the size category to which the object belongs, interpolating a relative distance within the distance range from the median feature measurement of the object, and monitoring the relative distance to the object as a function of changes in the median feature measurement value of the object and the size category to which the object belongs. Additionally, the method comprises correlating the relative distance to a following time for the host vehicle behind the vehicle.

Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

DETAILED DESCRIPTION

The foregoing problems are overcome by the herein-described systems and methods, which according to various embodiments employ a median value rather than a mean or average value; the median is a more noise resistant and statistically efficient measure of location, in contrast to the conventional approaches which produce continuous, smoothed measurements. In this manner, the described systems and methods categorize the size of an object to provide a discrete result.

One advantage of the described systems and methods is that pixels are discrete, and therefore the described discrete size categorization better corresponds to discrete pixel input measurements. It will be appreciated that although various embodiments described herein employ discrete size categorizations, fuzzy size categorizations may also be employed in conjunction with one or more embodiments, as will be understood by those of skill in the art. Additionally, as a host vehicle approaches the object, one pixel corresponds to an ever smaller fraction of the whole. The described approach employs filtering that assumes fixed error statistics, and therefore functions better using constant error size categorization. Moreover, the vehicle size categories into which forward vehicles are classified need not be spaced in any regular fashion. Rather, category resolution and/or granularity can be increased as desired to better distinguish between different vehicles. Additionally, the described categories limit the deleterious effects of noisy measurements and are therefore more robust.

Figure 1:
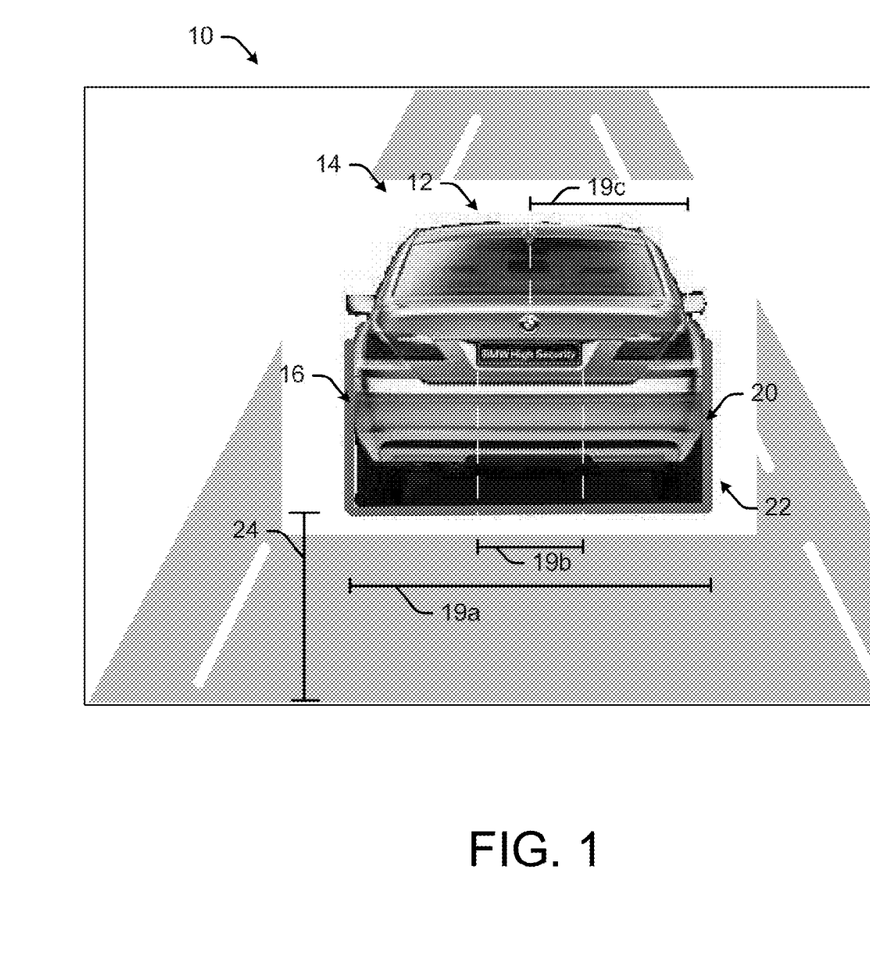
FIG. 1 illustrates a diagram of an object (e.g., a forward vehicle in front of the host vehicle) traveling on a road or other surface, taken by a camera (not shown) from the vantage point of a host vehicle (not shown) traveling behind the forward vehicle.

FIG. 1 illustrates a diagram or captured image 10 of a forward object (e.g., a vehicle) 12 traveling on a road or other surface 14, taken by a camera (not shown) from the vantage point of a host vehicle (not shown) traveling behind the forward vehicle. For instance, one or more video cameras mounted to a host vehicle can be used to measure the range to an object in their field of view using a discrete size categorization. In other embodiments, a fuzzy size categorization can be employed. A vehicle is used as an example for the object, but the principles described herein apply to other objects also. The vehicle has a left side 16, a bottom side 18, and a right side 20, as indicated by the U shape 22 surrounding the forward vehicle. The relative location or height 24 of the U bottom 18 in the image correlates with the distance to the forward vehicle. A U-shape that is higher up (i.e. whose bottom is higher up) in the image is further away from the camera. If the road between the camera and the object is assumed to be flat, then geometric calculations using the relative location directly give the distance to the vehicle.

The width of the vehicle in the image also gives a cue for the distance to it. If the actual, physical width of the vehicle is known, then geometric calculations also give the camera-to-object distance. If the actual physical width of the vehicle is not known, the range can be directly established using an additional input: e.g., a width in pixels may be measured. Width may be an actual vehicle width 19a, a width between vehicle features (e.g. tires, taillights, license plate edges etc.) 19b, 19c or any other suitable vehicle dimension. For example, if the same forward vehicle, with the same left and right-hand sides or features, measures twice as many pixels wide at some later instant, then it may be determined to be half the original distance away. That is, the range of the forward vehicle is inversely proportional to the width of the forward vehicle in pixels. For a given forward vehicle, a size category to which the vehicle is assigned remains constant as long as the vehicle remains in the image. E.g., if a vehicle has been categorized as being large, and it is only a few pixels wide in an image, then it must be far away.

Figure 2:
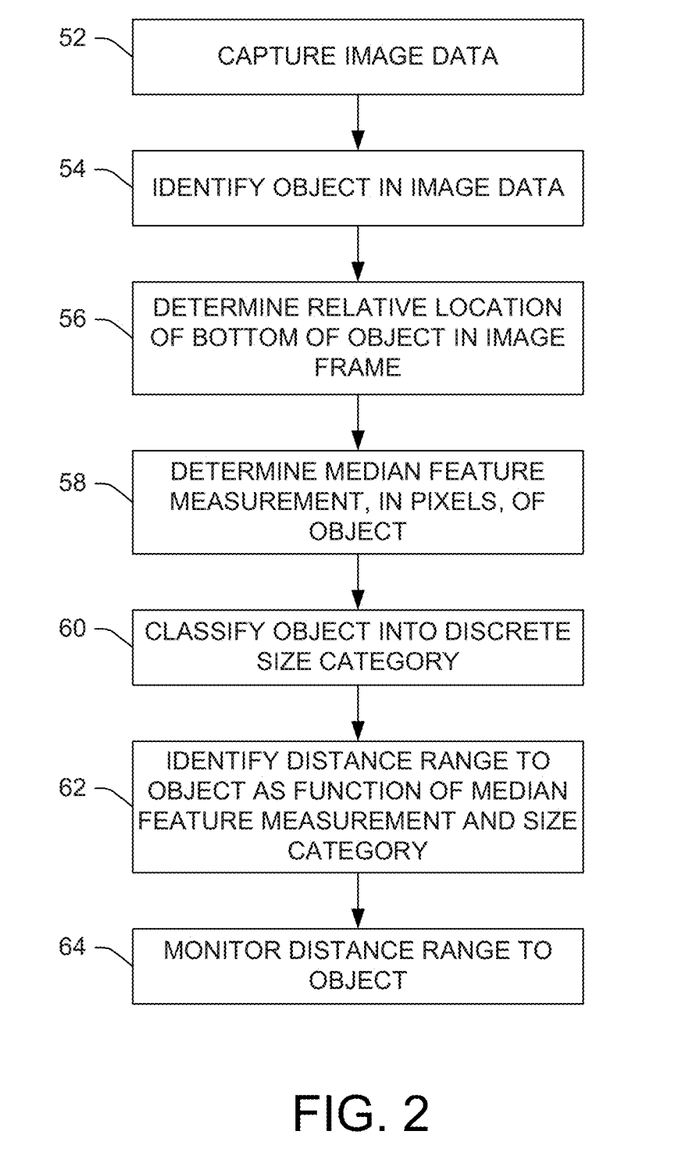
FIG. 2 illustrates a method that facilitates measuring range to a forward object, such as a vehicle, using object size categorization and median object width (in pixels), in accordance with one or more aspects described herein.

FIG. 2 illustrates a method that facilitates measuring range to a forward object, such as a vehicle, using object size categorization and median object width (in pixels), in accordance with one or more aspects described herein. At 52, image data is captured. At 54, an object is identified in the image data. At 56, the relative location (e.g., a height) of a lower or bottom surface of the forward object within the image frame is determined within at least one frame of image data using a known camera geometry. At 58, a median feature measurement (e.g., a feature width or the like), in pixels, of the forward object is determined. The median measurement value is a more efficient estimator of the size of an object than the average (mean), because fewer sample measurements are needed to obtain an accurate estimate of the object size. Additionally, a mean or average value assumes Gaussian distribution. However, when dealing with pixels, which are discrete values, such a Gaussian distribution can only be approximated and therefore using a mean value is less efficient. By using median values, the described systems and methods are faster and more noise resistant than conventional approaches.

At 60, the object is classified or categorized as belonging to at least one of a plurality of discrete size categories as a function of the relative location and median feature measurement of the object. At 62, a relative distance range is identified that correlates to a median feature measurement value for the discrete size category to which the object belongs. At 64, the relative distance range to the object is monitored as a function of changes in the median feature measurement value of the object and the discrete size category to which the object belongs. Monitoring the object facilitates detecting a rapid approach of the object, which in turn can facilitate collision avoidance. In one embodiment, the distance range is output to an antilock brake system (ABS), an adaptive cruise with braking (ACB) system, or other warning or control system.

With reference to determining the size category into which the object is to be classified at 60, the size category of an object does not vary once it is established. Establishing the size category involves using an initial absolute distance measure (e.g. the location of the bottom of the vehicle in the image 10, or a radar distance, or other similar signal). The width (or similar dimension) of the object is also measured, in pixels, as described at 58. A table lookup is performed, and/or a corresponding mathematical function is executed or evaluated, which uses as input the determined median width and absolute distance to the object and outputs a category. See, e.g., Table 1. The product of the table is a size category, such as, e.g. XS, S, M, L, XL, or XXL.

In one embodiment, once the object has been classified, the classification of the object is maintained as long as the object remains in the image data and/or within a field of view of the camera on the host vehicle. In another embodiment, the object type is identified by performing a table lookup on a lookup table that correlates feature measurement values, object location within and image frame, etc., to vehicle types (e.g., cement truck, tanker, tractor, passenger car, motorcycle, etc.). In yet another embodiment, a plurality of feature measurement median values are employed (e.g., object width, license plate width, bumper width, etc.) when classifying the object in order to facilitate a more precise classification of the object.

With continued reference to FIG. 2, an algorithm is executed (e.g., by a processor) to perform a table lookup on a table such as Table 1 by finding the row that corresponds to a range, locating the number of pixels measured for the median width, and reading the range (column). Table 1 shows an example related to size categorization of the pixel width of a bumper. Other tables can be established based on other features of the vehicle, such as license plate width, shape features of the vehicle (such as a cylindrical shape for a cement mixer or the like). The rows are found by looking for the borders bracketing the measured range, where each border is taken as indicating less than the listed value. For instance, if an initial range of 48 meters is measured, then it can be determined that 48 meters falls in the predetermined distance range of 40 and 50 meters. A width of 12 pixels (e.g., between 12 and 14) results in the forward object being classified or categorized in the "medium" size category, according to table 1.

According to one embodiment, the initial categorization performed at 60 may be repeated for super categorization, if desired. For instance, if the median width lies between categories, then the object is categorized as such, e.g. as M/L.

For objects that are very far away, only a few pixels may be needed to cover the width of the object (or similar discernible dimension or feature measurement). When the number of pixels for the largest and smallest categories differs by less than the number of categories, then an approximate supercategory may be assigned to the object. For instance, if trucks and cars at 200 meters distance cover between, e.g., 3 to 5 pixels, then only three widths are possible (3, 4 or 5 pixels) and so only three supercategories need be given. In a scenario in which six categories are employed (e.g., XS, S, M, L, XL and XXL), the supercategories could be, e.g., XS/S, M/L, and XL/XXL.

In one example, the number of categories employed is equal to or greater than a number of pixels differentiating between the largest and smallest object to place the object in a single category. For instance, if a range of 160 meters and width of 3 pixels is measured, then the object is placed in the supercategory XS/S. When the object is closer, the supercategory can be more finely divided and a single size category assigned. For example, using the 200 meter case above, the vehicle can be classified as being in the category S (subcategory of the supercategory XS/S). Once the category is established, then the category may be taken as constant thereafter. The invariant category then relates a dimension of the feature or width, measured in pixels, to the range of the object.

In another example, the relative location and representative feature of the object can be measured multiple times. This may be more likely in a situation when there are fewer objects in the captured image. The measurements of the single object are combined to provide a more precise characterization of the category in which the vehicle is established.

TABLE 1

Size Category

| Distance Range in meters | XS | S | M | L | XL | XXL |
|---|---|---|---|---|---|---|
| >150 m | 3 | 3 | 4 | 4 | 5 | 5 |
| 120 m-150 m | | | 5 | | | |
| 100 m-120 m | | | 6 | | | |
| 85 m-100 m | | | 7 | | | |
| 70 m-85 m | | | 8 | | | |
| 60 m-70 m | | | 9 | | | 14 |
| 50 m-60 m | | | 10-11 | | | |
| 40 m-50 m | | 11-13 | 12-14 | | | |
| 32 m-40 m | | 14-16 | 15-18 | | | |
| 25 m-32 m | | | 19-23 | | | |
| 18 m-25 m | | | 24-33 | | | |
| 12 m-18 m | | | 34-50 | | | |
| 7 m-12 m | | | 51-86 | | | |
| 4 m-7 m | 66 | 83 | 87-150 | 115 | 130 | 150 |
| <4 m | | | >150 | | | |

Dimension in Pixels

Once the size category has been assigned to the forward vehicle, it does not vary. The category table (Table 1) may then be used in the inverse sense. That is, given a median width in pixels and size category, the range to the forward vehicle may be read, e.g., by a processor. The range is given in "bins" as well. That is, given a size category and median width in pixels, there are a minimum and maximum distance that correspond to the median width.

According to one example, an intermediate pixel width, such as 20 pixels, can be linearly interpolated into a range. To further this example, a vehicle of category medium (M) has a width of 20 pixels. Entering the "medium" column in Table 1, it can be seen that a dimension of 20 pixels lies in the 5-pixel-wide cell from 19-23 pixels' width. A width of 19 pixels starts at a distance of 32 meters and goes to 32−((32−25)/5)=30.6 meters, and so is centered at 31.3 meters. A width of 20 pixels is (32−25)/5 meters closer, centered at 29.9 meters.

In a scenario in which multiple measurements are made of the size category, then multiple categories can be determined. The interpolation approach described above may be extended to vehicles that have been initially categorized into more than one category, including single intermediate categories, or "supercategories," such as XS/S. After the interpolation in the range is done, then the different categories may again be combined with the median, in order to determine the range to the vehicle. According to an example, referring to Table 1 above, suppose widths of 13 and 15 pixels have been measured, with categories S and M. Category S goes from 40 to 50 meters in the bin containing this width. These 10 meters are thus divided into three 3.33 meter sections, each having a half-width 1.67 meters. The width of 13 pixels is thus centered at 41.67 meters. Similar calculations for the other categories and width of 15 pixels give ranges of 36, 45 and 38 meters. The median of these ranges is half-way between 38 and 41.67 meters, at 39.84 meters. This value may be taken as the final range result for these size categories and measurements.

Categories are related to the product of the range to the forward vehicle and the measured dimension (e.g., the median width of the forward vehicle). For instance, a range of 50 meters and dimension of 7 pixels, would give a certain category, associated with 350 meter-pixels. In one example, 350 meter-pixels falls into category "small," encompassing all products between 300 and 400 meter-pixels. Additionally, it may be advantageous to geometrically increase the bounds of the categories. For instance, if an initial category is from 200 to 250 meter-pixels (a ratio of 250/200 or 1.25), then the "medium" category may be from 250 to 250*1.25 (=312.5) meter-pixels. The "large" category may be from 312.5 pixels to 312.5*1.25 or 390.625 meter-pixels. This geometric increase in category produces a constant error behavior in range to the forward vehicle, which may be advantageous in further calculations. It will be noted that the pixel dimension used above is arbitrary and could be physical also.

In one example, vehicles generally range in size from 1.4 to 2.5 meters in width. Therefore, according to this example, size category "extra small" (XS) may be defined as anything up to 1.4 m in width; "small" (S) as at least 1.4 m and at most 1.6 m; "medium" (M) as greater than 1.6 m and less than or equal to 1.8 m; "large" (L) as greater than 1.8 m and less than or equal to 2.0 m; "extra large" (XL) as greater than 2.0 m and less than or equal to 2.2 m; and "extra extra large" (XXL) as anything greater than 2.2 m. Since range is inversely proportional to vehicle width, conventional constant width categories may cause undesirably varying range errors (e.g., Kalman filtering typically uses a constant standard deviation for measurement noise). In contrast, the herein-described constant-range-error size categories avoid this problem.

According to another example, if the above vehicle width bounds (e.g., 1.4 to 2.5 meters) and six categories are used, with equal width categories, and in-between categories allowed, then their bounds are 1.4+integer*((2.5−1.4)/(6+5))=1.4+integer*0.1 meters. Half of the 0.1 meter width is the possible error, which is largest for the lowest bin. This lowest bin is centered at 1.4+(1/2)*0.1 meters. The error there is (0.1/2)/(1.4+(0.1/2))=+/−3.5%. The error at the highest bin is represented by 0.05/2.35=+/−2.1%. It can thus be shown that even with only a few size categories, good range resolution is possible. A large portion of this gain comes from the possibility of having (median) sizes that lie between categories, thus nearly doubling the resolution.

Figure 3:
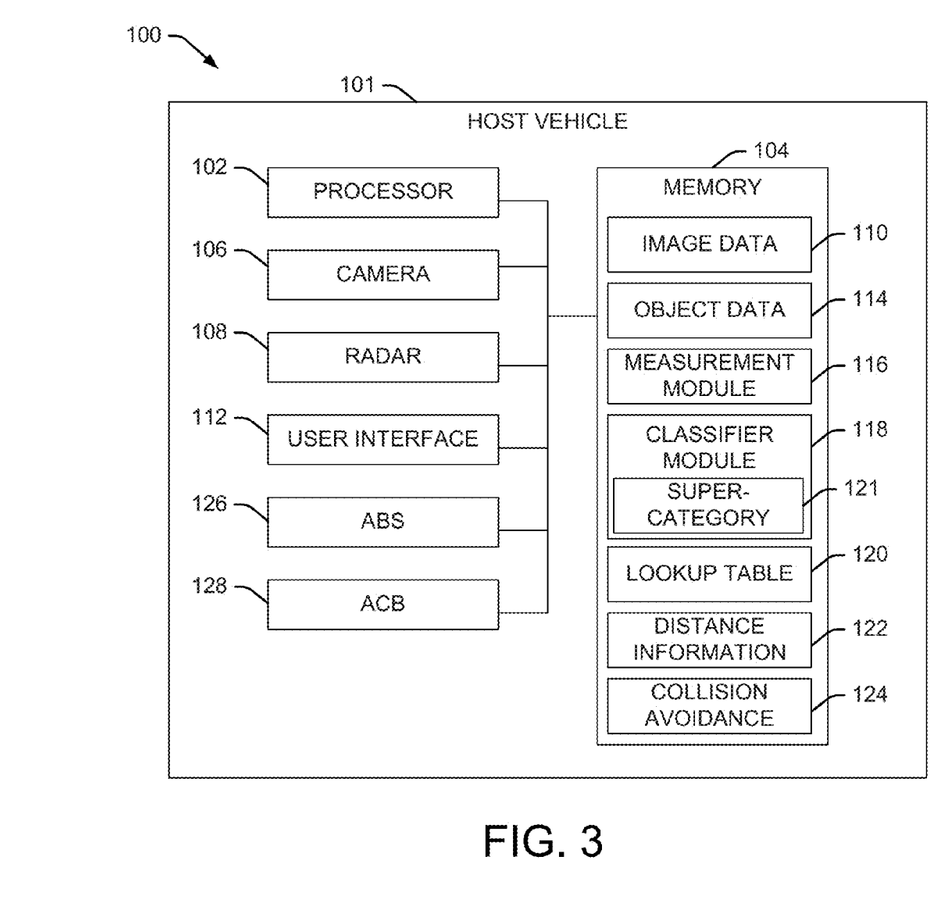
FIG. 3 illustrates a system that facilitates measuring range to a forward object, such as a vehicle, using object size categorization and median object width (in pixels), in accordance with one or more aspects described herein.

FIG. 3 illustrates a system 100 that facilitates measuring range to a forward object, such as a vehicle, using object size categorization and median object width (in pixels), in accordance with one or more aspects described herein. The system is configured to perform the various methods described herein, variants thereof, and the like. The system comprises a host vehicle 101 that includes a processor 102 that executes, and a memory 104 that stores, computer-executable instructions (e.g., modules, routines, programs, applications, etc.) for performing the various methods, techniques, protocols, etc., described herein. Coupled to the processor 102 and to the memory 104 is a camera 106 that monitors the forward area in front of the host vehicle and captures image data (e.g. still shots, video, etc.) of a forward object or vehicle. Additionally, the system may include a radar unit 108 that monitors the forward area in front of the host vehicle and captures data related to the relative location of the forward object and assists in establishing the relative location more precisely. This data is used in conjunction with the image data to establish the distance range to the object. In one embodiment, the image data 110 (e.g., an image or video of the forward vehicle) is presented to a user or driver on a user interface 112.

The memory 104 may include volatile, non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), variants of the foregoing memory types, combinations thereof, and/or any other type(s) of memory suitable for providing the described functionality and/or storing computer-executable instructions for execution by the processor 102. Additionally, "module," as used herein denotes a set of computer-executable instructions (e.g., a routine, sub-routine, program, application, or the like) that is persistently stored on the computer-readable medium or memory for execution by the processor, and/or a processor configured to execute the instructions to provide the described function.

The processor 102 identifies the forward object in the image data, and generates forward object data 114 (e.g. data regarding the shape and position of the forward object in one or more image frames comprise the image data). A measurement module 116 is executed by the processor to determine dimensions and/or other features of the forward object, including but not limited to a relative location or height of a lower or bottom surface of the forward object within at least one frame of image data using a known camera geometry. For instance, the relative location of the lower surface of the forward object may be a distance from a bottom of the image frame to the lower surface of the forward object in the image frame (e.g. where the tires of a vehicle meets the road on which the vehicle is traveling). In one embodiment, the relative location measurement is made in pixels, wherein respective pixel heights correspond to respective distances ahead of the host vehicle. The measurement module 116 also measures a median width of the forward object in pixels. For instance, the measurement module can measure width of the forward object across three or more frames and determine a median pixel width for the forward object.

The processor 102 executes a classifier module 118 that classifies or categorizes the forward object as belonging to at least one of a plurality of discrete size categories as a function of the relative location of the forward object as measured within at least one image frame and the median width of the forward object measured across a plurality of image frames. The classification of the forward object into a discrete size category involves taking an initial absolute distance measure (e.g. the distance range calculated using the location of the bottom of the vehicle in the image frame, or a radar distance, etc.) via the measurement module. The measurement module also measures width (or a similar dimension) of the forward object in pixels. A table lookup is performed by the processor 102 on a lookup table 120 (e.g., such as Table 1), and/or a corresponding mathematical function is executed or evaluated, which uses as input the determined median width and absolute distance to the object, and the processor outputs a size category for the forward object, such as, e.g. XS, S, M, L, XL, or XXL. Although the herein described examples set forth size categories ranging from "extra small" to "extra extra large," it will be understood by those skilled in the art that any suitable discrete category type or name and/or number of categories may be employed in accordance with various aspects presented herein, and that the herein described systems and methods are not limited to six categories and/or the particular labels used herein.

In one embodiment, the classification module 118 includes a super category module 121 that repeats the initial categorization on the forward object by the classification module 118. For instance, if the median width of the vehicle lies between categories, e.g. on the border between medium and large, then the object is categorized as such, i.e. as "M/L".

Once the processor has classified the vehicle size and determined the vehicle's median width, a distance range to the vehicle is identified (e.g., via table lookup as described with regard to FIG. 2) that correlates to a median width value for the discrete size category to which the forward object belongs. Distance information 122 comprising a distance or distance range to the forward object is output (e.g., on the user interface 112) and monitored as a function of changes in the median width value of the forward object and the discrete size category to which the forward object belongs. For instance, a relative distance from the host vehicle to the forward object can be interpolated by the processor as a function of median vehicle width and distance range. The relative distance to the forward object is output and monitored by the processor as a function of changes in the median width value of the forward object and the discrete size category to which the forward object belongs. Optionally, the relative distance to the forward object can be correlated to a time period or "following time" that temporally describes the distance between the host vehicle and the forward object as a function of the relative speeds thereof, and an alert is presented to the driver of the host vehicle if the following time falls below a predetermined following time threshold.

Monitoring the forward vehicle facilitates detecting a rapid approach of the forward vehicle, which in turn can facilitate collision avoidance. For example, if the monitored distance range to the forward vehicle becomes too small or decreases too rapidly, the processor can transmit an alert to the driver via the user interface to prompt the driver to initiate braking. Additionally or alternatively, the processor can execute the collision avoidance module 124 and transmit a signal to an antilock brake system (ABS) 126 to automatically initiate a braking response in the host vehicle. In another embodiment, the collision avoidance module may be in separate controller and only the distance is output to the separate controller. For instance, the collision avoidance module may be integral to the ABS 126, integral to an adaptive cruise-with-braking (ACB) unit or module 128, or integral to any other suitable controller or warning system. According to an example, the distance range is output to either a warning system that uses the distance range in combination with the vehicle speed to determine when to warn the driver of a potential collision or a brake control intervention system, such the ACB 128, which modifies the vehicle speed by braking the vehicle if the distance is too close.

In one embodiment, the processor alerts the driver via the user interface that following time is too low if the quotient of the distance to the forward vehicle divided by the host vehicle speed is too small, such as can occur during tailgating. In one example the alert is issued by the processor to the driver via the user interface when the following time is below approximately 1 second. In another embodiment, the processor issues an alert to the driver via the user interface when a time-to-collision is below a predetermined collision time threshold as determined by the collision avoidance module.

Figure 4:
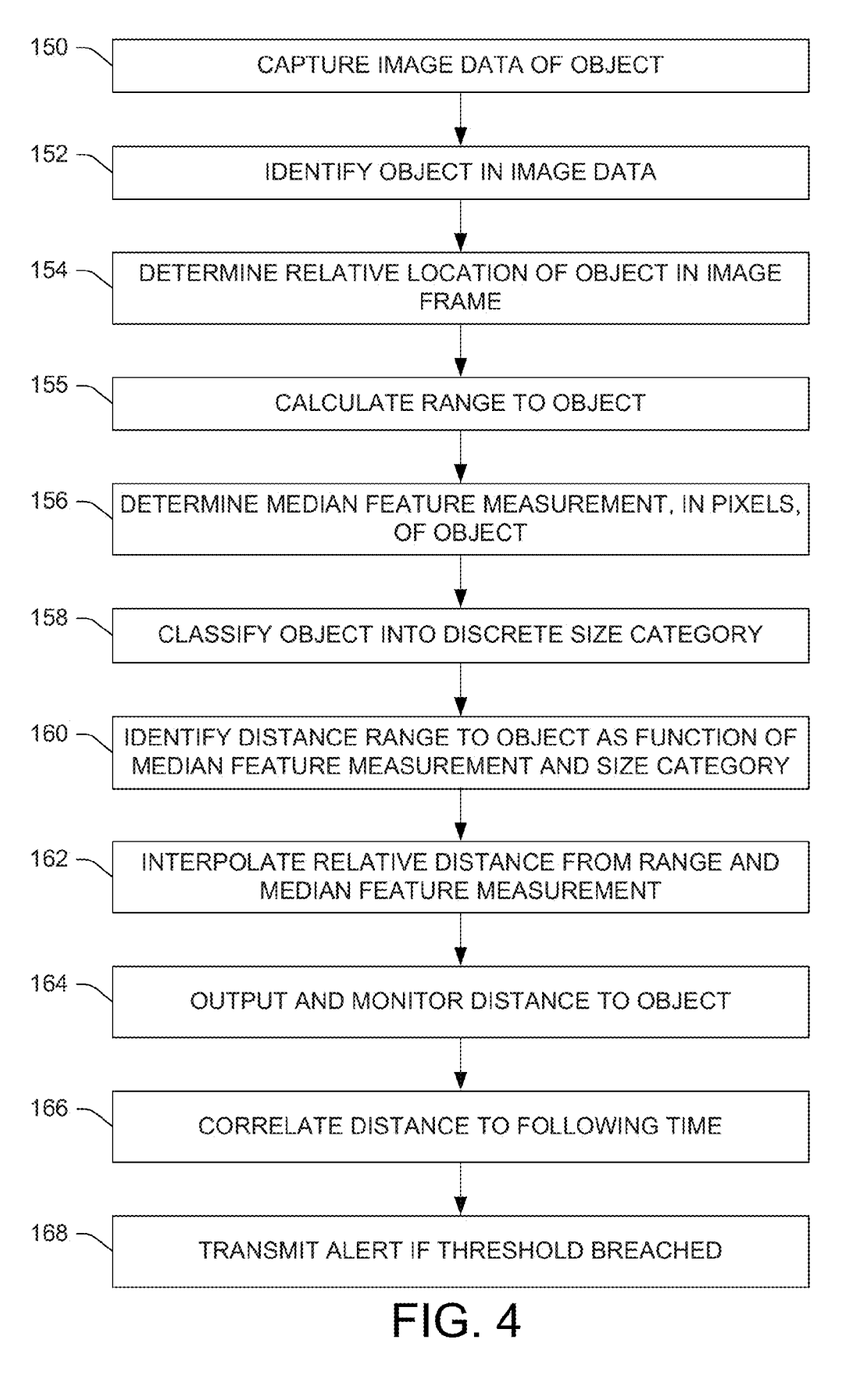
FIG. 4 illustrates a method of measuring distance to a forward object, such as a vehicle, using object size categorization and median object width (in pixels), in accordance with one or more aspects described herein.

FIG. 4 illustrates a method of measuring distance to a forward object, such as a vehicle, using object size categorization and median object width (in pixels), in accordance with one or more aspects described herein. At 150, image data of an object is received. At 152, the object is identified in the image data. At 154, the height or relative location of a lower or bottom surface of the object is determined within at least one frame of image data using a known camera geometry. At 156, a median feature measurement (e.g., a width or other dimension), in pixels, of the object is determined. At 158, the object is classified or categorized as belonging to at least one of a plurality of discrete size categories as a function of the relative location (e.g., height) and median feature measurement (e.g., width) of the object. At 160, a distance range is identified that correlates to a median feature measurement value for the discrete size category to which the object belongs.

At 162, a relative distance from the host vehicle to the object is interpolated as a function of median feature measurement value and distance range. At 164, a relative distance to the object is monitored as a function of changes in the median width value of the forward object and the discrete size category to which the forward object belongs. The relative distance can be output to an antilock brake system (ABS), an adaptive cruise with braking (ACB) system, or other warning or control system. At 166, the relative distance to the object is correlated to a time period or "following time" that temporally describes the distance between the host vehicle and the object as a function of the relative speeds thereof. At 168, an alert is presented to the driver of the host vehicle if the following time falls below a predetermined following time threshold. It will be appreciated that the alert can be provided by, e.g., a camera module or by any other suitable controller, as will be understood by one of skill in the art.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A method for estimating distance from a host vehicle to an object, comprising:
capturing image data; and
via a processor:
identifying an object in the image data;
determining a relative location of the object within at least one frame of image data;
determining a median feature measurement, in pixels, of the object;
classifying the object as belonging to at least one of a plurality of size categories as a function of the relative location and median feature measurement of the object;
identifying a distance range to the object based on the classification; and
interpolating a distance from the identified distance range as a function of the median feature measurement of the object.

2. The method according to claim 1, wherein the relative location of the object is a distance to a lower surface of the object measured from a bottom of at least one frame of the image data using a known camera geometry.

3. The method according to claim 1, wherein the identified distance range to the object correlates to a median feature measurement value for the size category to which the object belongs.

4. The method according to claim 1, further comprising monitoring a relative distance to the object as a function of changes in the median feature measurement value of the forward object and the size category to which the object belongs.

5. The method according to claim 1, further comprising iteratively classifying the object.

6. The method according to claim 5, wherein when the iterative classifications of the object result in the object being classified in two adjacent size categories, assigning the forward object to a supercategory that comprises at least the two adjacent categories.

7. The method according to claim 6, further comprising identifying a distance range for the object as a function of the median feature measurement of the object and the supercategory to which the object is assigned.

8. The method according to claim 7, further comprising interpolating a distance from the identified distance range as a function of the median feature measurement of the object.

9. The method according to claim 1, further comprising:
outputting the identified distance range on a graphical display.

10. The method according to claim 1, further comprising:
maintaining the classification of the object as long as the object remains in the image data.

11. The method according to claim 1, further comprising:
identifying the object as a vehicle and performing a table lookup to determine the type of the vehicle.

12. The method according to claim 1, further comprising:
employing a plurality of feature measurements for a plurality of object features when classifying the object.

13. A processor configured to estimate distance from a host vehicle to an object, wherein the processor is configured to:
receive image data;
identify an object in the image data;
determine a relative location of the object within at least one frame of image data;
determine a median feature measurement, in pixels, of the object;
classify the object as belonging to at least one of a plurality of size categories as a function of the relative location and median feature measurement of the forward object;
identify a distance range to the object based on the classification; and
interpolate a distance from the identified distance range as a function of the median feature measurement of the object.

14. The processor according to claim 13, wherein the relative location of the object is a distance to a lower surface of the object measured from a bottom of at least one frame of the image data using a known camera geometry.

15. The processor according to claim 13, wherein the identified distance range to the object correlates to a median feature measurement value for the size category to which the object belongs.

16. The processor according to claim 13, further configured to monitor a relative distance to the object as a function of changes in the median feature measurement value of the object and the size category to which the object belongs.

17. The processor according to claim 13, further configured to iteratively classify the object.

18. The processor according to claim 17, wherein when the iterative classifications of the object result in the object being classified in two adjacent size categories, the processor is further configured to assign the object to a supercategory that comprises at least the two adjacent categories.

19. The processor according to claim 18, further configured to identify a distance range for the object as a function of the median feature measurement of the object and the supercategory to which the object is assigned.

20. The processor according to claim 19, further configured to interpolate a distance from the identified distance range as a function of the median feature measurement of the object.

21. The processor according to claim 13, configured to receive the additional relative location information of the object from a radar unit.

22. The processor according to claim 13, further configured to output the identified distance range on a graphical display.

23. A method for estimating distance from a host vehicle to a forward object, comprising, via a processor:

receiving image data;
identifying an object in the image data;
determining the distance of a lower surface of the object within at least one frame of image data using a known camera geometry;
determining a median feature measurement, in pixels, of the object;
classifying the object as belonging to at least one of a plurality of size categories as a function of the distance and median feature measurement of the object;
identifying a distance range that correlates to a median feature measurement value for the size category to which the object belongs;
interpolating a relative distance within the distance range from the median feature measurement of the object,
monitoring the relative distance to the object as a function of changes in the median feature measurement value of the object and the discrete size category to which the object belongs; and
correlating the relative distance to a following time for the host vehicle behind the object.

24. The method according to claim 23, further comprising:
determining a following time threshold as a function of the relative distance and a relative speed between the host vehicle and the object as determined by at least one of an antilock brake system (ABS) and an adaptive cruise-with-braking (ACB) system; and
providing an alert if the relative distance to the object falls below the following time threshold.

* * * * *